P. BROMAN & J. OFFERMANN.
AGRICULTURAL IMPLEMENT.
APPLICATION FILED SEPT. 28, 1911.

1,058,657.

Patented Apr. 8, 1913.

P. BROMAN & J. OFFERMANN.
AGRICULTURAL IMPLEMENT.
APPLICATION FILED SEPT. 28, 1911.

1,058,657.

Patented Apr. 8, 1913.

2 SHEETS—SHEET 2.

Witnesses:

Inventors:
Peter Broman & Joseph Offermann
By their Attorney

UNITED STATES PATENT OFFICE.

PETER BROMAN AND JOSEPH OFFERMANN, OF BEAVER DAM, WISCONSIN.

AGRICULTURAL IMPLEMENT.

1,058,657.  Specification of Letters Patent.  Patented Apr. 8, 1913.

Application filed September 28, 1911. Serial No. 651,764.

*To all whom it may concern:*

Be it known that we, PETER BROMAN and JOSEPH OFFERMANN, citizens of the United States, residing at Beaver Dam, in the county of Dodge and State of Wisconsin, have invented certain new and useful Improvements in Agricultural Implements, of which the following is a specification.

This invention relates to agricultural implements and has particular reference to the construction and arrangement of scraper attachments for the disk type of seeding machines.

The objects of the invention are to provide improvements in the position, adjustment and operation of a scraping-shoe and to facilitate its mounting and removal without disturbing other parts of the seeding machine.

With these objects in view our invention consists in the novel construction, combination and arrangement of parts hereinafter described in detail, illustrated in the accompanying drawing and particularly pointed out in the appended claims.

Figure 1:
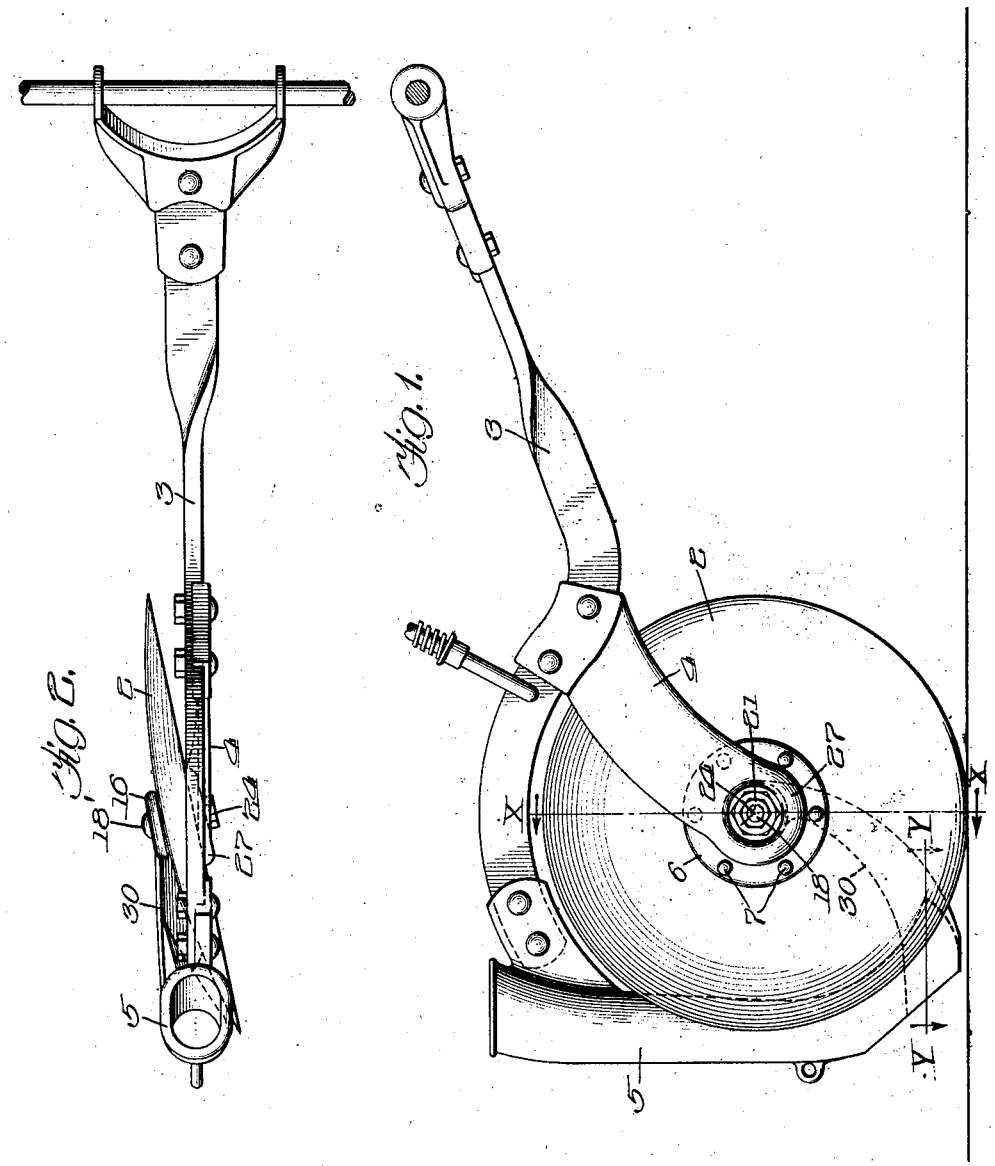
Figure 2:
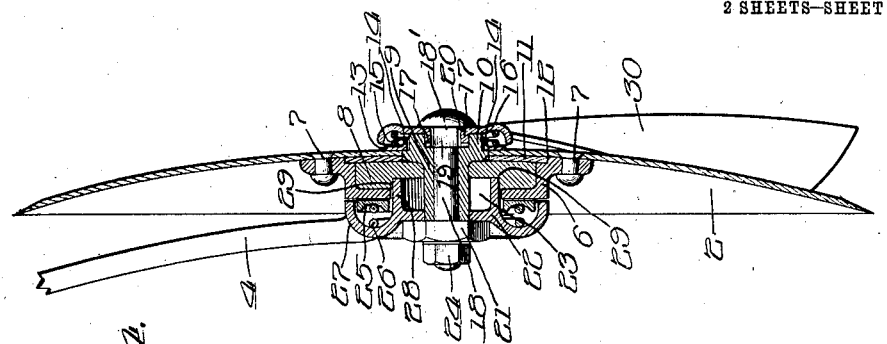
Figure 5:
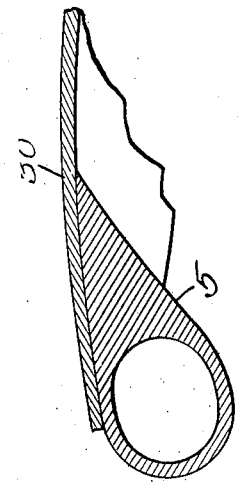
Figure 3:
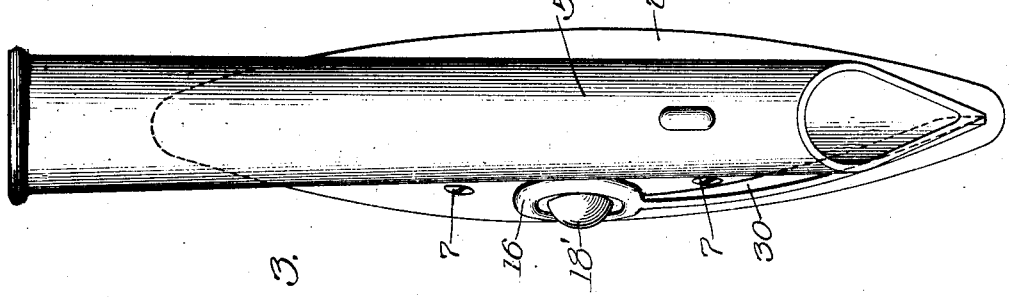

In the drawing—Figure 1 is a side elevation of a grain drill disk, together with the parts immediately associated therewith, such as seed-chute or "boot," the draft-bar on which the boot and disk are mounted, and our improved shoe applied thereto. Fig. 2 is substantially a top plan view of the parts shown in Fig. 1. Fig. 3 is an end or edge view of the disk, boot and shoe. Fig. 4 is an enlarged section taken substantially on line X—X of Fig. 1. Fig. 5 is an enlarged section taken substantially on line Y—Y of Fig. 1.

In the several views 2 represents one of the seed-furrow-forming disks of a grain drill, or seeding machine, composed of a gang of such disks. 3 represents the draw-bar through which the disk, boot and scraper-shoe are connected with one of these well known types of machines; 4 is a bearing-bracket, connected in any suitable manner with the draw-bar and carrying the bearings or mountings for the disk 2, and 5 is the "boot" or chute in the rear of the disk. This is the usual and well known construction.

Referring, now, to the disk and scraper-bearings on the arm or bracket 4, with which the essential features of this invention are connected, 6 is a saucer-shaped bearing-member rigidly secured to the concave side of the usual form of disk 2 by means of rivets 7. It therefore rotates with the disk. The depression within the saucer-shaped member 6 is filled by a thick washer 8 which has a square hole therethrough that is engaged by a similarly squared sleeve 9 provided with a circular head 10. Between the washer 8 and the disk 2 is interposed a thin washer, or perforated disk, 11 made of hard metal to withstand wear against the washer 8. The outer edge of the disk or washer 11 is seated in an annular rabbet 12 formed in the flange of the saucer-shaped bearing-member 6, and said disk 11 is held firmly between said flange and the disk 2, as shown in Fig. 4. Against the opposite, or convex, side of the disk 2, and around the sleeve-head 10, is mounted a dust-ring 13. This ring is formed with a laterally projecting flange 14 which extends from said ring's inner periphery and is adapted to bear against the circular head 10. This dust-ring is spring-pressed against the convex side of the disk 2 by means of a spring 15 that is interposed between said dust-ring and a cap 16 which is the hub-attachment or bearing-part of the scraper 30. This cap is a disk of metal formed out of the fixed end of the scraper, which we term the shoe, and has a square bolt-hole formed therethrough in such a manner as to provide inwardly projecting lugs 17. The latter are engaged with opposite sides of a recess in the end of the head 10, as shown in Fig. 4. As also shown in said figure the cap 16 is formed with an annular depression which contains and supports the spring 15. This cap is clamped against the head 10 by the head of a bolt 18 formed with a squared portion 19 engaging a substantially square recess 20 formed between the lugs 17 and the head recess. On the threaded end of the bolt 18 is a nut 24 which bears against the left-hand end of the sleeve 9 (looking at Fig. 4). This end of the sleeve is threaded.

22 is a bearing-member which is integral with the arm or bracket 4. In the member 22 is an oil-chamber 23 provided with suitable oil-holes (not shown) that communicate with the parts to be oiled. The bearing-member 22 is somewhat similar in form to the cap 16 in that it is provided with means for supporting a pressure-ring and a spring to bear against the rotating member 6. The thick washer 8 and the bearing-member 22 are clamped together between the head 10 of the sleeve 9 and a nut 21 on the threaded end of said sleeve. As the bearing-member 22 is fixed on the arm 4 and said bearing-member, washer 8 and sleeve 9 are clamped together, the only parts shown in Fig. 4 which rotate are the disk 2 and the washer 11, the cap 16 being held against rotation by the engagement of its lugs 17 with the parallel walls of the recess 20 in the head 10 of the sleeve 9. Thus the sleeve 9 is substantially a clamping-bolt holding the disk-bearings together rigidly with relation to the arm 4. The connection between the bearing-member 22 and the thick washer 8 is effected through the walls for the oil-space 23. These walls are an inwardly projecting hub 28 on the member 22 which bears against the washer 8 on one side while the head 10 of the sleeve bears against the opposite side of said washer. As shown in Fig. 4, the oil-chamber 23 is extended partly into the washer 8. This permits the thickness of the washer 8 to fill the entire depth of the saucer-shaped member 6 and provides a wide bearing-surface between the members 6 and 8 regardless of the depth of the oil-space 23, or the thickness of metal required between the hub 28 and the head 10. Against the bottom of the saucer-shaped member 6 is placed a dust-ring 25 which is held against the member 6 by a coiled spring 26 mounted in a trough-portion 27 of the member 22. The side of the dust-ring is, as shown, slightly concaved to form an annular seat-recess for the spring. The saucer-shaped member 6 has an opening through its bottom through which the hub 28 is extended to the washer 8, the recess in the latter for the hub being labeled 29.

Extending from the cap 16 downwardly and rearwardly is a disk-cleaning or scraping blade 30, which we term the "shoe" of our invention, and same is held free of the boot 5 in the manner stated above against rotation relative to the disk 2. It will be noticed that the bearings for the disk 2 are held together and intact between the head 10 and the nut 21 regardless of the shoe attachment which is clamped between the head 10 of the sleeve 9 and the head of the bolt 18, which is labeled 18'. Notwithstanding this the shoe and disk-bearings are substantially one, and any angular movement of the disk bearings will therefore be communicated to the shoe; that is, the shoe will follow the lateral movements of the disk bearings and always be held in the same relative relation to the disk whether its bearings wabble or not. Where the shoe is attached to some other stationary part it will not follow such movements of the disk and is apt to be moved inoperatively far away from the disk at times while at other times it may scrape against the disk like a brake. By making the disk and shoe bearings substantially one in this manner the adjustment of the shoe relative to the side of the disk may be made more exact and no allowances need be made for variations between disk bearings and the shoe bearings.

Another important feature of the present invention is the convenience with which the shoe may be removed or replaced without disturbing or taking apart other portions of the machine. In the removal of the shoe all that is involved is the removal of the bolt 18.

Having thus described our invention, we claim as new and desire to secure by Letters Patent—

1. The combination with a draw-bar, of a bearing-bracket suspended from said draw-bar, a bearing-stud secured to said bracket, a disk revolubly mounted on said stud, a dust-ring bearing against said disk, a spring pressing said dust-ring against said disk, and a combination spring-retainer and shoe secured to said stud.

2. In a grain-drill, the combination with a draw-bar, of a bearing-arm 4, a sleeve, 9 disk-bearings mounted upon said sleeve, a disk revolubly mounted on said disk-bearings, means for securing said disk-bearings and sleeve together and thereby supporting said disk on its bearings, a shoe, and a clamping bolt passing through said sleeve and shoe and clamping same together.

In testimony whereof we have hereunto set our hands in the presence of two subscribing witnesses.

PETER BROMAN.
JOSEPH OFFERMANN.

Witnesses:
JOHN C. HEALY,
JAMES T. HEALY.